United States Patent
Achhammer et al.

(10) Patent No.: US 6,315,074 B1
(45) Date of Patent: Nov. 13, 2001

(54) DEVICE AND METHOD FOR TRIGGERING AN OCCUPANT PROTECTION SYSTEM IN THE EVENT OF A MOTOR VEHICLE ROLLOVER

(75) Inventors: Günter Achhammer, Regenstauf; Telmo Glaser, Regensburg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/677,560
(22) Filed: Oct. 2, 2000

Related U.S. Application Data

(63) Continuation of application No. PCT/DE99/00936, filed on Mar. 26, 1999.

(30) Foreign Application Priority Data

Mar. 30, 1998

(DE) .............................................. 198 14 154

(51) Int. Cl.⁷ .................................................. B60K 28/14
(52) U.S. Cl. .............................. 180/282; 280/735; 701/45
(58) Field of Search ............................ 280/735; 180/271, 180/282; 701/45

(56) References Cited

U.S. PATENT DOCUMENTS

| | | |
|---|---|---|
| 4,038,876 * | 8/1977 | Morris . |
| 4,715,468 * | 12/1987 | Baumann et al. . |
| 5,261,506 * | 11/1993 | Jost . |
| 5,890,084 * | 3/1999 | Halasz et al. . |
| 5,925,084 * | 7/1999 | Gotoh et al. . |
| 5,977,653 * | 11/1999 | Schmid et al. . |
| 6,002,975 * | 12/1999 | Schiffmann et al. . |
| 6,154,697 * | 11/2000 | Otsuka . |
| 6,212,455 * | 4/2001 | Weaver . |

FOREIGN PATENT DOCUMENTS

| | | |
|---|---|---|
| 430813-A1 * | 6/1991 | (EP) . |
| WO-00/58133 * | 10/2000 | (WO) . |

\* cited by examiner

Primary Examiner—Paul N. Dickson
(74) Attorney, Agent, or Firm—Herbert L. Lerner; Laurence A. Greenberg; Werner H. Stemer

(57) ABSTRACT

A device and method for triggering an occupant protection system when a motor vehicle tilts about a longitudinal axis includes a rate-of-rotation sensor, an inclination sensor, which can be a mechanical inclination switch, and a triggering device. The rate-of-rotation sensor detects a rotation rate about the longitudinal axis and generates an output signal. The inclination sensor detects motor vehicle inclination and generates an output signal. The mechanical inclination switch serves as safing sensor. The triggering device activates an occupant protection system based upon the rotation and the inclination output signals. The occupant protection system triggers only when both the rate-of-rotation sensor indicates a rotary movement greater than or equal to a specific value and the inclination sensor indicates an inclination angle greater than or equal to a given value. The triggering device blocks an activation of the occupant protection system when the inclination signal indicates a tilted position of the vehicle lasting longer than a predetermined time interval even if the rotation signal subsequently indicates a motor vehicle tilting movement about the longitudinal axis.

8 Claims, 1 Drawing Sheet

DEVICE AND METHOD FOR TRIGGERING AN OCCUPANT PROTECTION SYSTEM IN THE EVENT OF A MOTOR VEHICLE ROLLOVER

CROSS-REFERENCE TO RELATED APPLICATION

This is a continuation of copending International Application PCT/DE99/00936, filed Mar. 26, 1999, which designated the United States.

BACKGROUND OF THE INVENTION

Field of the Invention

The invention lies in the automotive technology field. The invention relates to a device and a method for triggering an occupant protection system in the event of a motor vehicle rollover. The expression "motor vehicle rollover" as used herein includes both a threatened motor vehicle rollover and a rollover that is actually taking place.

Occupant protection systems that can be activated in the event of a motor vehicle rollover include, for example, passive restraint systems such as, i.e., a head airbag, a side airbag, a seat belt pretensioning system, a seat belt clamping system, and/or an upwardly foldable rollover bar. Furthermore, occupant protection can also be enhanced by using systems that can be activated during and after an accident (post-crash systems). Such systems can include, for example, generating an emergency signal, opening the central locking, switching on the hazard warning system, and/or switching off the fuel pump.

German Patent DE 35 45 874 C1, corresponding to U.S. Pat. No. 4,715,468, discloses a device triggering an occupant protection system in the event of a motor vehicle tilting movement about a motor vehicle longitudinal axis. The device includes an inertia switch that is closed when there are vehicle accelerations in the vehicle's x- and y-planes above a specific acceleration value. When the threshold is exceeded, the device activates a rollover bar occupant protection system. Connected in parallel with the inertia switch is a series circuit made of inclination switches, which detect rolling movements of the motor vehicle, and suspension switches. The rollover bar is triggered whenever one of the inclination switches responds and one of the suspension switches signals rebounding of a motor vehicle rear wheel. However, in certain circumstances, for example, extreme cornering, there is the risk of an unnecessary, surprising, and, therefore, dangerous triggering of the occupant protection system. Correct, timely triggering of the occupant protection system is not ensured in all accident situations.

European Patent 0 430 813 B1 discloses an occupant protection system including a gyrometer and three accelerometers that determine the longitudinal, transverse, and vertical accelerations of the motor vehicle. The triggering device of the occupant protection system is activated either when the combined longitudinal and transverse accelerations exceed a prescribed threshold value, when the gyrometer output signal is situated above a specific threshold, or when the gyrometer output signal integrated over a prescribed time interval exceeds a specific threshold. The gyrometer output signal is, however, not referred to a fixed space coordinate system, and, therefore, does not permit a firm conclusion on the actual angle of inclination of the motor vehicle with reference to the horizontal plane. For the system, certain is difficulties are encountered for determining the triggering threshold value.

SUMMARY OF THE INVENTION

It is accordingly an object of the invention to provide a device and a method for triggering a motor vehicle occupant protection system that overcomes the hereinafore-mentioned disadvantages of the heretofore-known devices and methods of this general type and that permits reliable triggering of the occupant protection system in the case of a motor vehicle rollover.

With the foregoing and other objects in view, there is provided, in accordance with the invention, a device for triggering an occupant protection system when a motor vehicle tilts about a motor vehicle longitudinal axis, including a rate-of-rotation sensor detecting a rate of motor vehicle rotation about a longitudinal axis of the motor vehicle and for generating a rotation output signal, an inclination sensor for detecting motor vehicle inclination and for generating an inclination output signal, and a triggering device for activating an occupant protection system based upon the rotation output signal and the inclination output signal, the triggering device connected to the rate-of-rotation sensor and the inclination sensor and configured to trigger an occupant protection system only when both the rate-of-rotation sensor outputs a signal indicating a rotary movement greater than or equal to a specific value, and the inclination sensor outputs a signal indicating a motor vehicle inclination angle greater than or equal to a given value.

Incipient vehicle rollovers can be sensed in good time using the rate-of-rotation sensor in conjunction with the inclination sensor. Specifically, an impending rollover can be detected very quickly because the rate of rotation measured by the rate-of-rotation sensor provides such a statement at a sufficiently early point in time. However, the occupant protection system is not triggered until the inclination sensor signals an (absolute) oblique position of the motor vehicle likely to cause an accident. The triggering of the occupant protection system can take place virtually without delay upon response of the inclination sensor because the rate-of-rotation sensor has already detected the incipient vehicle rollover. Therefore, the inclination sensor serves as a safing sensor. However, depending on the accident situation it is also possible for the inclination sensor to respond initially, resulting in the occupant protection system being immediately triggered when the rate-of-rotation sensor also responds.

Because two sensors based on different measuring principles are provided, the reliability of the occupant protection system can be greatly increased. For example, the rate-of-rotation sensor can be based on the measuring principle of using the Coriolis force, which acts on moving bodies in a rotating reference system. In contrast, the gravitational force of the earth is preferably utilized for the inclination sensor. As such, the inclination sensor can detect the inclination uniaxially about the vehicle longitudinal axis, or omnidirectionally in the vehicle plane.

The triggering signals generated by the rate-of-rotation sensor and inclination sensor are combined, as it were, in the form of an "AND" operation, such that the occupant protection system is ignited only when both conditions are fulfilled.

In accordance with another feature of the invention, the triggering device is configured to block activation of the occupant protection system when the inclination output signal indicates a tilted position of the motor vehicle lasting longer than a predetermined time interval even if the rotation output signal subsequently indicates a motor vehicle tilting movement about the motor vehicle longitudinal axis.

Because the inclination sensor indicates the absolute angular position of the vehicle, at least roughly, it is possible to is prevent triggering of the occupant protection system in the event of a tilting back of the motor vehicle from the vertical position of the vehicle, or a position on its roof, or a position on its side into the normal position. Specifically, if the occupant protection system should not have responded in the event of rollover of the motor vehicle for reasons of whatever sort, for example, because of an extremely sloweddown vehicle rollover, or because of a strong deliberate tilting (i.e., extreme jacking up in a workshop) with the ignition switched off, there is a risk that, should the motor vehicle be tilted back again into the normal position by the persons involved in the accident or by the recovery staff, the occupant protection system would be triggered. For example, the rollover bar could be erected suddenly. The feature inherently endangers the persons located at or in the vehicle. Such endangerment can be avoided by using the inclination sensor to block a triggering signal. The safety feature can be implemented in terms of circuitry in a simple way by blocking the occupant protection system from being triggered when the inclination sensor signal indicates that the motor vehicle has been in a tilted position over a lengthy period of time exceeding a prescribed threshold value even if the output signal of the rate-of-rotation sensor should subsequently signal the start of a rotation. Particularly when the output signal of the rate-of-rotation sensor has dropped temporarily to zero, the signal state constitutes a reliable criterion for the vertical or lateral position that has, in the meantime, been assumed, in other words, in a stationary state. In particular, the criterion, namely that the inclination sensor signals a pronounced tilted position over a long term, whereas the output signal of the rate-of-rotation sensor is situated below a prescribed, low threshold value, at least for a certain short time interval, can be used by the control device for the purpose of blocking subsequent triggering of the occupant protection system.

The inclination sensor is preferably constructed as an inclination switch that, instead of an analog signal requiring a further evaluation, outputs only a "digital" signal of "On/Off"—which can be detected with particular ease by the triggering device or by an evaluation circuit and which requires no further processing.

Alternatively, the inclination switch can also have one dedicated switching signal output for each of the two oppositely directed directions of inclination it is capable of sensing. Thus, the switch indicates not only the exceeding of a specific inclination value but also the tilting direction. Therefore, the evaluation circuit can also use an algorithm to detect the tilting direction of the rate-of-rotation sensor and inclination sensor, and, thus, of the motor vehicle.

The invention can advantageously not only be used in newly-constructed occupant protection systems, but can also be retrofitted in already existing systems, for example, airbag systems. Retrofitting can be performed by installing a rate-of-rotation sensor with an inclination sensor and loading the appropriate evaluation and triggering routines.

In accordance with an added feature of the invention, it is also possible to accommodate the rate-of-rotation sensor, the inclination sensor and, if appropriate, the evaluation circuit in a separate housing similar to the satellite concept for side airbags. Given the presence of triggering criterion, the separate unit transmits an ignition command to a central control unit of the occupant protection system for the purpose of activating the protection system.

In accordance with an additional feature of the invention, there is provided an evaluation circuit for evaluating the rotation output signal and the inclination output signal, the evaluation circuit being connected to the rate-of-rotation sensor, the inclination sensor, and the triggering device. The evaluation circuit can also be disposed in a housing different from those holding the rate-of-rotation sensor and the inclination sensor.

With the objects of the invention in view, there is also provided a method for triggering an occupant protection system when a motor vehicle tilts about a motor vehicle longitudinal axis, including the steps of measuring a rate of rotation of the motor vehicle about the motor vehicle longitudinal axis, measuring an angle of inclination of the motor vehicle, and triggering the occupant protection system only if both the measured rate of rotation, and the measured angle of inclination exceed given values.

In accordance with yet another mode of the invention, there is provided the step of blocking the triggering of the occupant protection system when a measured angle of inclination and a measured rate of rotation initially indicate a stable tilted position of the motor vehicle, and a subsequently measured rate of rotation indicates a rotation of the motor vehicle.

In accordance with a concomitant mode of the invention, there is provided the step of blocking the triggering of the occupant protection system when a measured angle of inclination and a measured rate of rotation initially indicate a tilted position of the motor vehicle lasting longer than a predetermined time interval and a subsequently measured rate of rotation indicates a rotation of the motor vehicle.

Other features that are considered as characteristic for the invention are set forth in the appended claims.

Although the invention is illustrated and described herein as embodied in a device and method for triggering an occupant protection system in the event of a motor vehicle rollover, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
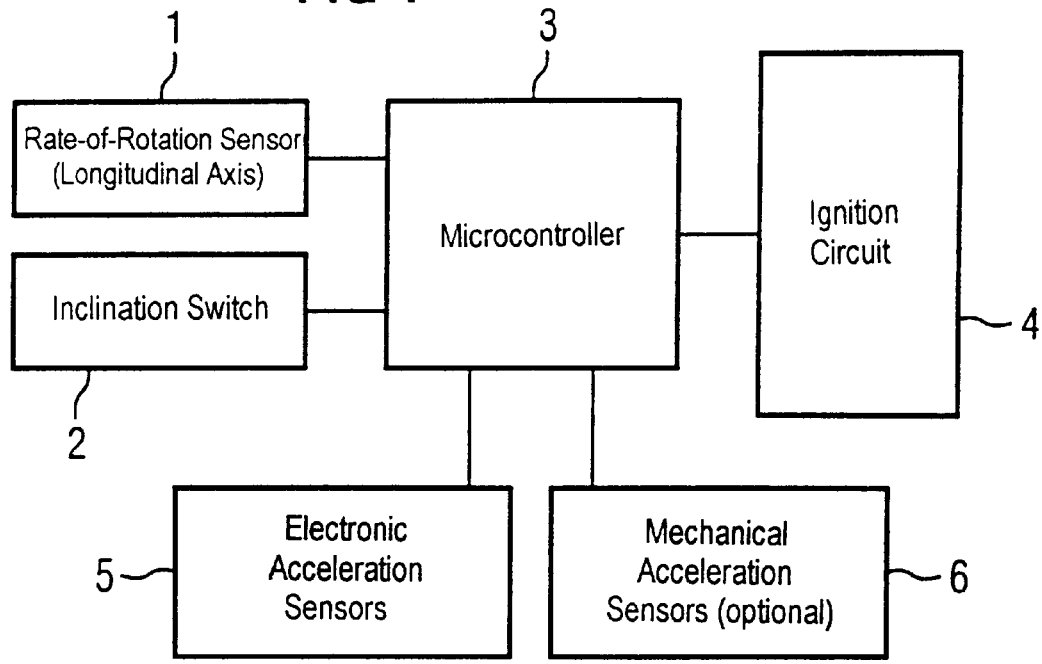
FIG. 1 is a block circuit diagram of a first exemplary embodiment of an occupant protection system according to the invention.

In all the figures of the drawing, sub-features and integral parts that correspond to one another bear the same reference symbol in each case.

Referring now to the figures of the drawings in detail and first, particularly to FIG. 1 thereof, there is shown a rate-of-rotation sensor 1, which measures the rate of a rotary movement taking place about the motor vehicle longitudinal axis of the motor vehicle. The sensor 1 is formed, for example, by an electronic gyrometer sensor and an inclination sensor 2, which specifies the absolute angular position of the motor vehicle relative to the horizontal plane. The inclination sensor 2 is preferably constructed as a mechanical inclination switch that outputs a digital output signal of "on/off", and changes the state of its output signal when a specific motor vehicle angular position is reached. The inclination switch 2 can detect the angle of inclination of the motor vehicle either uniaxially in the form of the lateral-tilting angle, or omnidirectionally in the vehicle plane. A triggering circuit (evaluation device) 3 in the form of a micro-controller receives the output signals of the sensors 1, 2 and switches over into a state of activation readiness when the rate of rotation measured by the rate-of-rotation sensor 1 exceeds a prescribed threshold value, and/or when the output signal, integrated over a specific time interval, of the rate-of-rotation sensor 1 exceeds a specific threshold value, which in each case signals the risk of a motor vehicle rollover. However, the triggering circuit actually generates an activation signal only when the output signal of the inclination sensor 2 also specifies that the vehicle has reached or exceeded a specific angle of inclination. The activation signal is applied to one or more ignition circuits 4 that activate the occupant protection system, for example, by igniting one or more ignitors. As already mentioned, the occupant protection system can be a side airbag system or a head airbag system, a seat belt pretensioning system, a seat belt clamping system, an erectable rollover bar, or some other type of protection system such as, for example, an emergency call system.

The triggering circuit 3 is configured to also check the time response of the output signals of the sensors 1 and 2. If the inclination switch 2 generates a longer term signal, in other words, for more than a specific time interval of, for example, 1 to 10 minutes, the triggering circuit 3 interprets an output signal indicating vehicle tilting as a stable tilted vehicle state, for example, a position on its side or a position on its roof. In this condition, the rate-of-rotation sensor 1 no longer signals rotary movement. Then, the triggering circuit 3 blocks the generation of an activation signal even should the output signal of the rate-of-rotation sensor 1 rise again. Such subsequent rotary movement is interpreted as a deliberately exerted tilting back movement for restoring the motor vehicle to the normal position. Thus, activation of the occupant protection system is blocked in order to prevent endangering the persons participating in the tilting back movement and/or still located in the vehicle.

If required, the device according to the invention can be fitted additionally with electronic and/or mechanical acceleration sensors 5, 6, which detect vehicle accelerations in the vehicle's longitudinal or transverse directions, or in the vertical direction, and feed their output signals to the triggering circuit 3. As a result, it is possible to achieve an even more refined detection and analysis of a threatened vehicle rollover or vehicle impact, such that the triggering circuit 3 can determine the triggering decision as a function of these acceleration variables, as well.

In the exemplary embodiment shown in FIG. 1, the rate-of-rotation sensor and the inclination sensor 2 are integrated into an already existing control unit 3 of the occupant protection system, for example, an airbag control unit for the front airbag and/or side airbag.

Figure 2:
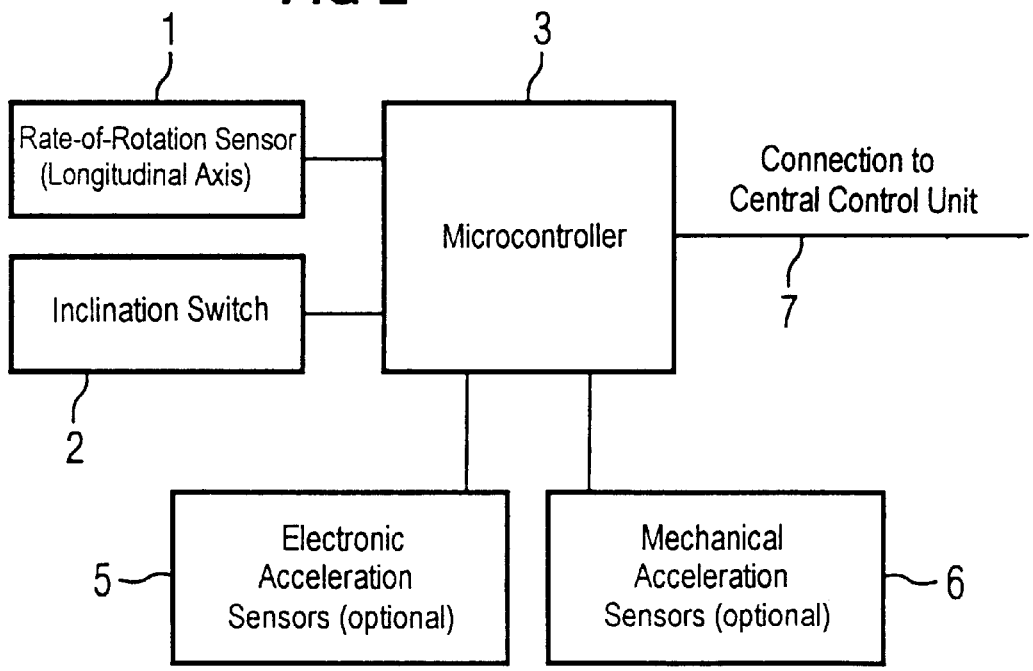
FIG. 2 is a block circuit diagram of another embodiment of an occupant protection system according to the invention.

With regard to the construction and functioning of the components 1, 2, 3, 5 and 6 (the latter optionally), the exemplary embodiment of the device according to the invention shown in FIG. 2 is identical to the exemplary embodiment shown in FIG. 1. However, the rate-of-rotation sensor 1, the inclination sensor 2, and the triggering circuit 3 in accordance with FIG. 2 are accommodated in a separate housing and can be, therefore, retrofitted separately or installed selectively in new vehicles. The triggering circuit 3 is connected to a non-illustrated central control unit, in particular, an airbag control unit, through a line 7, and transmits an ignition command to the unit when the triggering criteria are fulfilled. Upon receiving the ignition command, the central control unit controls the activation of an occupant protection system.

We claim:

1. A device for triggering an occupant protection system when a motor vehicle tilts about a motor vehicle longitudinal axis, comprising:

a rate-of-rotation sensor detecting a rate of motor vehicle rotation about a longitudinal axis of the motor vehicle and for generating a rotation output signal;

an inclination sensor for detecting motor vehicle inclination and for generating an inclination output signal; and a triggering device for activating an occupant protection system based upon the rotation output signal and the inclination output signal, said triggering device connected to said rate-of-rotation sensor and said inclination sensor and configured to trigger an occupant protection system only when both said rate-of-rotation sensor outputs a signal indicating a rotary movement greater than a specific value and said inclination sensor outputs a signal indicating a motor vehicle inclination angle greater than a given value, said triggering device blocking an activation of the occupant protection system when the inclination output signal indicates a tilted position of the motor vehicle lasting longer than a predetermined time interval even if the rotation output signal subsequently indicates a motor vehicle tilting movement about the motor vehicle longitudinal axis.

2. The device according to claim 1, wherein said inclination sensor is an inclination switch.

3. The device according to claim 1, which comprises a housing enclosing said rate-of-rotation sensor (1) and another housing enclosing said inclination sensor (2).

4. The device according to claim 3, including an evaluation circuit for evaluating the rotation output signal and the inclination output signal, said evaluation circuit being connected to said rate-of-rotation sensor, said inclination sensor, and said triggering device, and being disposed in one of said housings different from said housings holding said rate-of-rotation sensor and said inclination sensor.

5. The device according to claim 1, including an evaluation circuit for evaluating the rotation output signal and the inclination output signal, said evaluation circuit connected to said rate-of-rotation sensor, said inclination sensor, and said triggering device.

6. A method for triggering an occupant protection system when a motor vehicle tilts about a motor vehicle longitudinal axis, which comprises:

measuring a rate of rotation of the motor vehicle about the motor vehicle longitudinal axis;

measuring an angle of inclination of the motor vehicle; and triggering the occupant protection system only if both the measured rate of rotation, and the measured angle of inclination exceed given values and blocking the triggering of the occupant protection system when a measured angle of inclination and a measured rate of rotation initially indicate a stable tilted position of the motor vehicle, and a subsequently measured rate of rotation indicates a rotation of the motor vehicle.

7. A method for triggering an occupant protection system when a motor vehicle tilts about a motor vehicle longitudinal axis, which comprises:

measuring a rate of rotation of the motor vehicle about the motor vehicle longitudinal axis;

measuring an angle of inclination of the motor vehicle; and triggering the occupant protection system only if both the measured rate of rotation, and the measured angle of inclination exceed given values and blocking the triggering of the occupant protection system when a measured angle of inclination from an inclination sensor and a measured rate of rotation from a rate-of-rotation sensor initially indicate a stable tilted position of the motor vehicle, and a subsequently measured rate of rotation indicates a rotation of the motor vehicle.

8. A method for triggering an occupant protection system when a motor vehicle tilts about a motor vehicle longitudinal axis, which comprises:

measuring a rate of rotation of the motor vehicle about the motor vehicle longitudinal axis;

measuring an angle of inclination of the motor vehicle; and triggering the occupant protection system only if both the measured rate of rotation, and the measured angle of inclination exceed given values and blocking the triggering of the occupant protection system when a measured angle of inclination and a measured rate of rotation initially indicate a tilted position of the motor vehicle lasting longer than a predetermined time interval and a subsequently measured rate of rotation indicates a rotation of the motor vehicle.

* * * * *